US005915076A

United States Patent [19]
Sugita

[11] Patent Number: 5,915,076
[45] Date of Patent: Jun. 22, 1999

[54] IMAGE PROCESSING APPARATUS AND METHOD

[75] Inventor: Mitsuro Sugita, Utsunomiya, Japan

[73] Assignee: Canon Kabushiki Kaisha, Tokyo, Japan

[21] Appl. No.: 08/763,624

[22] Filed: Dec. 4, 1996

Related U.S. Application Data

[63] Continuation of application No. 08/489,456, Jun. 12, 1995, abandoned.

[30] Foreign Application Priority Data

Jun. 14, 1994 [JP] Japan .................................. 6-131637

[51] Int. Cl.$^6$ .................................................. G06K 15/00
[52] U.S. Cl. ............................................ 395/109; 395/112
[58] Field of Search ..................................... 395/101, 106, 395/108, 109, 112; 358/518, 519, 520–524, 504–505, 535; 101/211, 202, 171, 484; 345/429, 430, 431, 432, 426

[56] References Cited

U.S. PATENT DOCUMENTS

| | | | |
|---|---|---|---|
| 4,256,131 | 3/1981 | De Remigis | 356/405 |
| 4,929,978 | 5/1990 | Kakamori et al. | 358/520 |
| 4,967,379 | 10/1990 | Ott | 364/526 |
| 5,317,425 | 5/1994 | Spence et al. | 358/504 |
| 5,317,678 | 5/1994 | Okawara et al. | 345/426 |
| 5,489,996 | 2/1996 | Oku et al. | 358/518 |

*Primary Examiner*—Arthur G. Evans
*Attorney, Agent, or Firm*—Fitzpatrick, Cella, Harper & Scinto

[57] ABSTRACT

A beam tracking calculating device by a Monte Carlo method is used as an image reproducibility presuming apparatus of a recording matter, image reproducibility of the recording matter after the recording is presumed from characteristics of a material to be recorded and a recording color material, and it is used and fed back to a recording condition, thereby reproducing an image. A presuming method and apparatus for presuming an image reproducibility of the recording matter after the recording are obtained with enough precision from the characteristics of the material to be recorded and the recording color material. By using the presuming method and apparatus and performing the feedback control of the recording condition, an image adjusting device which can automatically adjust the recording with high precision without performing a test print, and an excellent image reproducing apparatus using such an image adjusting device, can be obtained.

22 Claims, 7 Drawing Sheets

30° INCIDENCE

IMAGE PROCESSING APPARATUS AND METHOD

This application is a continuation of application Ser. No. 08/489,456 filed on Jun. 12, 1995, now abandoned.

BACKGROUND OF THE INVENTION

1. Field of the Invention

The present invention relates to image processing apparatus and method for automatically determining an optimum image recording condition in the image recording on the basis of characteristics of a paper and an ink.

2. Related Background Art

A paper, an OHP sheet, and the like can be mentioned as materials to be recorded in the printing, electrophotograph, ink jet, and the like. An ink, a toner, and the like can be mentioned as recording color materials.

Hitherto, as a recording and adjusting method in an image recording apparatus, as disclosed in Japanese Utility Model Application Laid-open No. 5-25872, there has been known a type such that a test print is performed to a part of the stacked paper and is detected and the detection result is fed back to the recording condition.

According to the above adjusting method, however, since a test output is previously performed to obtain an image output which is actually desired paper is wasted.

On the other hand, as disclosed in Japanese Patent Application Laid-open Nos. 5-80625 and 5-221051, there are apparatuses which detect characteristics of a material to be recorded and a recording color material without performing a test print and execute recording and adjustment.

However, even if the characteristics of the material to be recorded and the recording color material are previously known, presuming method and apparatus for presuming image reproducibility of a recording matter after the recording by using the characteristic values are necessary.

On the other hand, hitherto, as disclosed in Japanese Patent Application Laid-open No. 5-176166 and Japanese Patent Publication No. 6-26906, there is a method of presuming by using a theoretical expression of what is called Kubelka-Munk or the like.

The existing presuming apparatuses, however, have a problem such that an image reproducibility cannot be presumed with enough precision.

As an example about the presuming precision, the presuming apparatus of the Kubelka-Munk type will now be described.

The theory of Kubelka-Munk uses a light diffusion equation in which, with respect to the behavior of light in the recording matter, it is projected and approximated one-dimensionally, namely, in the direction of thickness of the recording matter.

Therefore, in an actual image having a three-dimensional structure, particularly, a recording matter without translation symmetry in the area direction, namely, in the plane direction perpendicular to the thickness direction of the area type half-tone recording, actual image, or the like, an optical dot gain effect or the like cannot be correctly introduced and a problem occurs in the presuming precision.

FIGS. 7A and 7B are diagrams showing such an optical dot gain effect. FIG. 7A shows the case where the incident light was diffused in the area direction. FIG. 7B shows the case where it was one-dimensionally handled. Gradations in those cases are set to 36% and 52%, respectively.

FIG. 8 is a graph showing an example of the relation between an area factor of the recording color material and the gradation in such two kinds of handling methods. It will be understood that the gradation in the one-dimensional handling is largely deviated from that of the three-dimensional handling method in its half tone.

Such a deterioration in presuming precision is not limited to the foregoing monochromatic gradation performance. In a color mixed image using a multi-color recording color material, such a deterioration also occurs with respect to the hue direction and causes a large problem from a viewpoint of the color prediction.

SUMMARY OF THE INVENTION

It is an object of the invention to provide an image processing apparatus and method which can solve the above problems.

Another object of the invention is to presume image reproducibility at a high precision, thereby enabling optimum image forming characteristic values to be set.

Still another object of the invention is to enable a recording adjustment to be automatically executed without performing a test print.

A further object of the invention is to provide an image reproducing system including not only control of an image recording matter but also of illumination.

According to a preferred embodiment of the invention, the above objects are accomplished by an image processing apparatus comprising: characteristic value input means for inputting image forming characteristic values in an image formation; presuming means for three-dimensionally presuming image reproduction information of an image formed on the basis of the image forming characteristic values; target reproduction information input means for inputting reproduction information of a target image; and setting means for setting the image formation characteristic values on the basis of the image reproduction information presumed and the target reproduction information.

The above and other objects and features of the present invention will become apparent from the following detailed description and the appended claims with reference to the accompanying drawings.

BRIEF DESCRIPTION OF THE DRAWINGS

FIGS. 7A and 7B are diagrams showing a difference of optical dot gain effect presumption in dependence on a processing method, in which FIG. 7A shows the case where it was three-dimensionally handled and FIG. 7B shows the case where it was one-dimensionally handled.

DETAILED DESCRIPTION OF THE PREFERRED EMBODIMENTS

Embodiment 1

Figure 5:
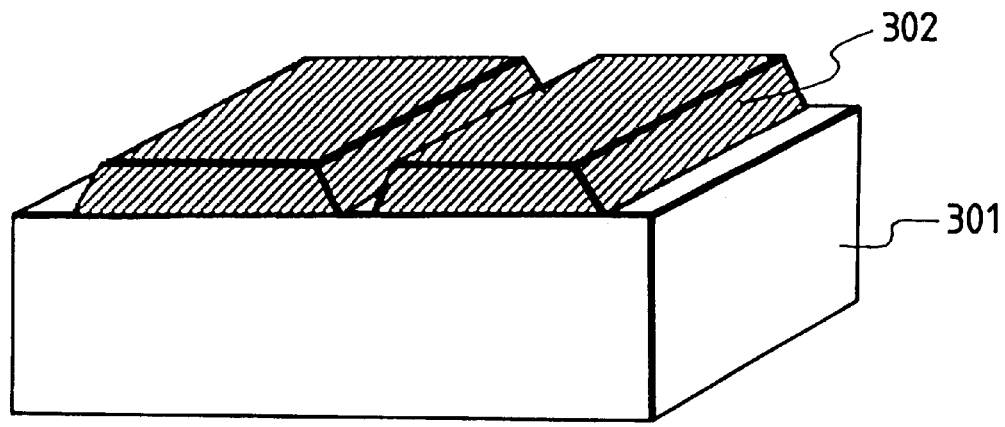
FIG. 5 is a schematic perspective view of an electrophotographic recording matter of embodiment 1.

In an embodiment 1, an electrophotographic recording matter as shown in FIG. 5 is used. The recording matter has a structure such that a recording color material 302, namely, a toner, exists on a material 301 to be recorded, that is, a paper in contact therewith. In the invention, an image recording method is not particularly limited to an electrophotograph but to any one of the ink jet recording, thermal printer, laser beam printer, and the like, can be also applied.

Figure 1:
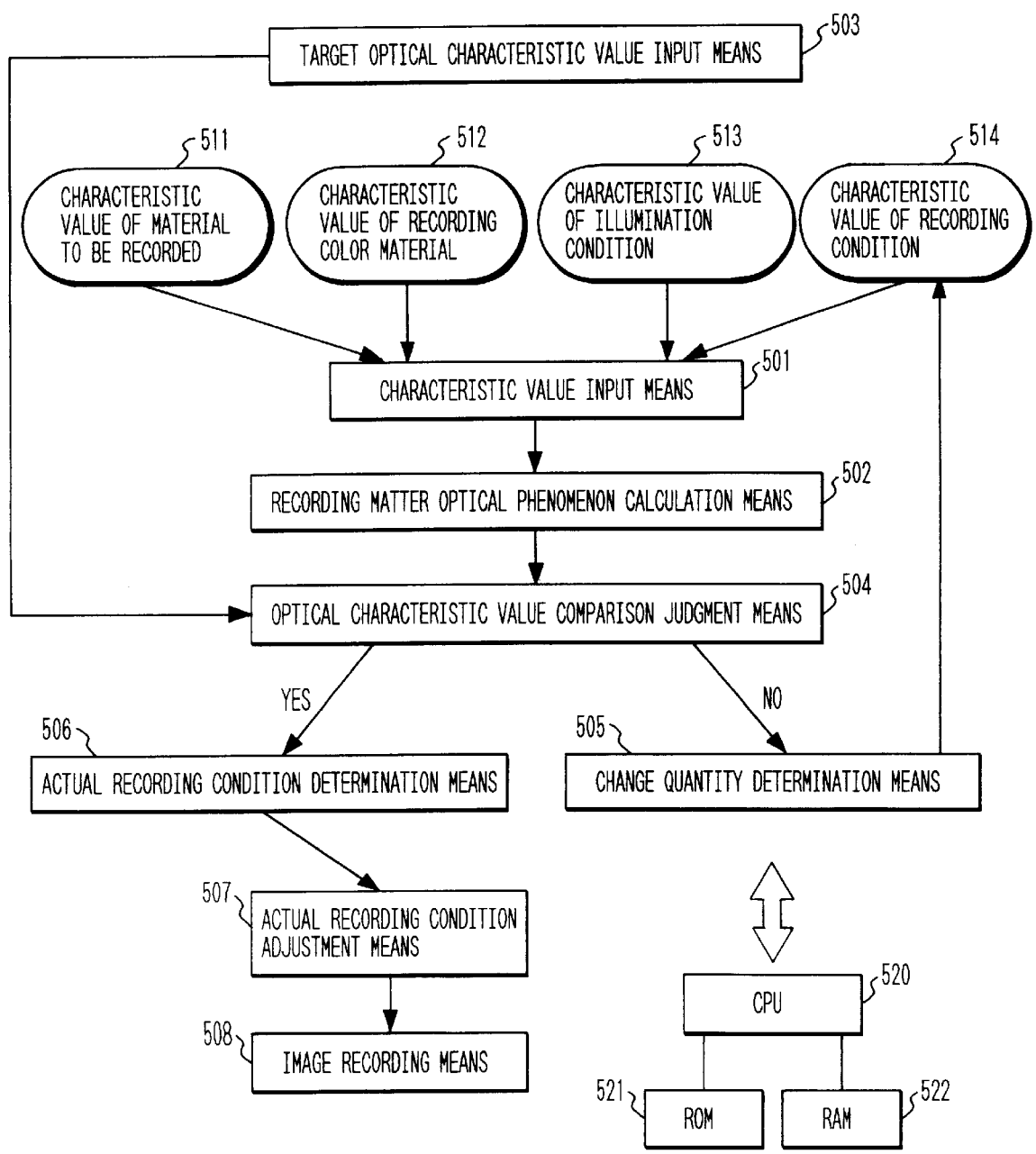
FIG. 1 is a block diagram showing an example of a construction of an image processing apparatus according to an embodiment 1.
Figure 2:
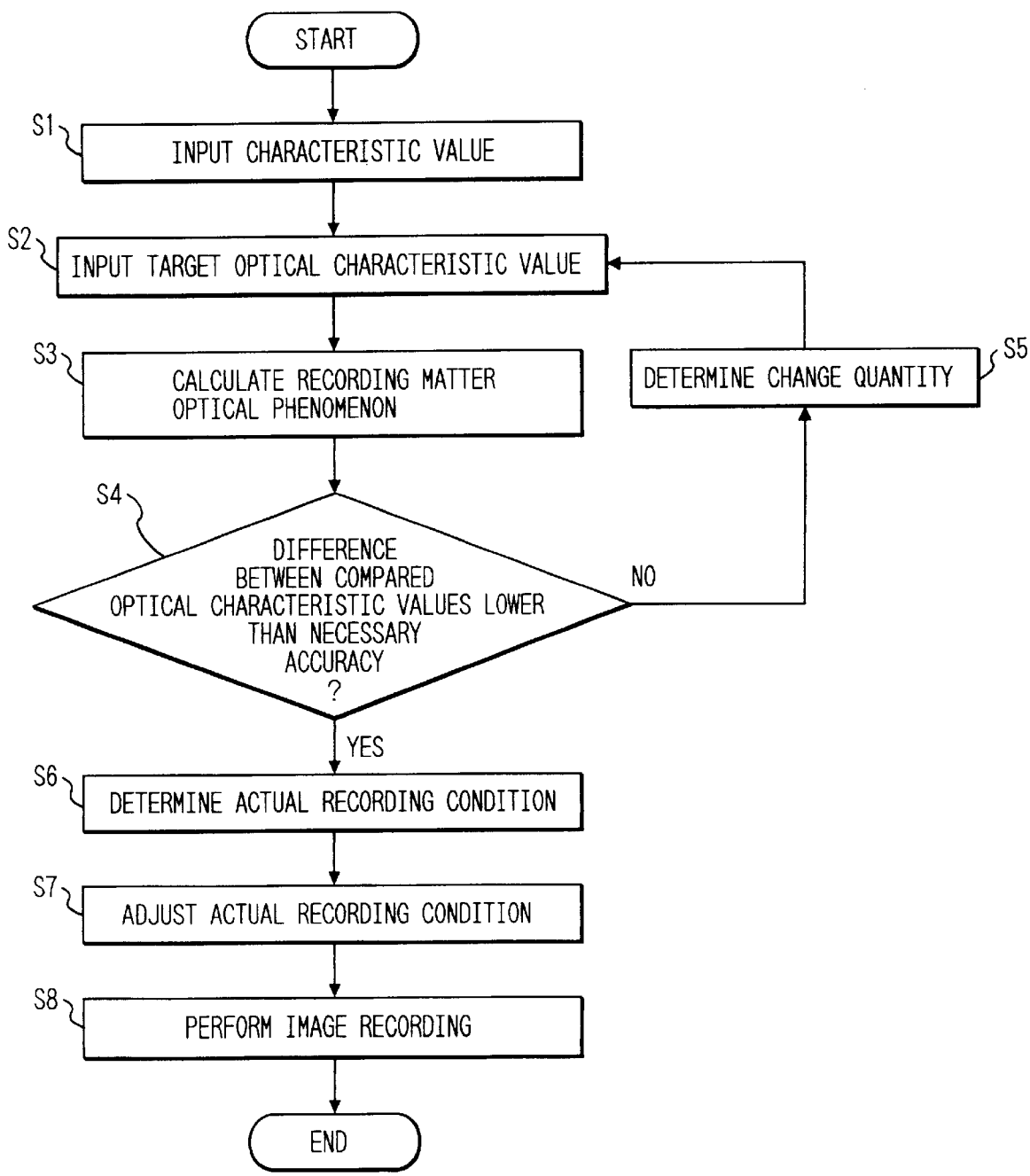
FIG. 2 is a flowchart showing an example of a flow of processing steps according to the embodiment 1.

Explanation will now be made hereinbelow with reference to FIG. 2 showing a flow of the embodiment and FIG. 1 showing its construction.

Characteristic value input means 501 is an apparatus for inputting characteristic values 511 of the material to be recorded, characteristic values 512 of the recording color material, characteristic values 513 of an illumination condition, and characteristic values 514 of a recording condition (S1).

In the embodiment, a scattering coefficient $S_p(\lambda)$ and an adsorption coefficient $a_p(\lambda)$ are used as characteristic values 511 of the material to be recorded. In addition to them, characteristic values regarding the beam propagation such as refractive index, surface reflectance, scattering angle distribution, and the like can be properly added.

A scattering coefficient $S_t(\lambda)$ and an absorption coefficient $c(\lambda)$ are used as recording color material characteristic values 512. Further, characteristic values regarding the beam propagation such as refractive index, surface reflectance, scattering angle distribution, and the like can be also properly added.

Characteristic values 513 of the illumination condition are characteristic values regarding the illumination condition at the time of measurement. For example, there are a condition value of an equal energy white light of an incident angle 7° and the like.

As characteristic values 514 of the recording condition, shape values such as thickness, width, area, and the like of the toner and a toner density are used. Now, assuming that the ink jet recording is used for image recording, there are characteristics of the ink, a discharge speed of the ink, a discharge quantity, an ink dot diameter, and the like as recording condition characteristic values. In case of the thermal printer or laser beam printer, for example, values regarding heat and light energies are used as such characteristic values.

Recording matter optical phenomenon calculation means 502 three-dimensionally calculates an optical phenomenon in the recording matter on the basis of the characteristic values 511 of the material to be recorded, characteristic values 512 of the recording color material, characteristic values 513 of the illumination condition, and characteristic values 514 of the recording condition which were inputted by the characteristic value input means 501, thereby calculating optical characteristic values of the recording matter (S3). In the embodiment, a spectrum reflection intensity as one expression of color information is used as an optical characteristic value of the recording matter. A beam tracking calculating apparatus by a Monte Carlo method is used as an optical phenomenon calculating apparatus.

The above calculating apparatus will now be described hereinbelow.

Figure 6:
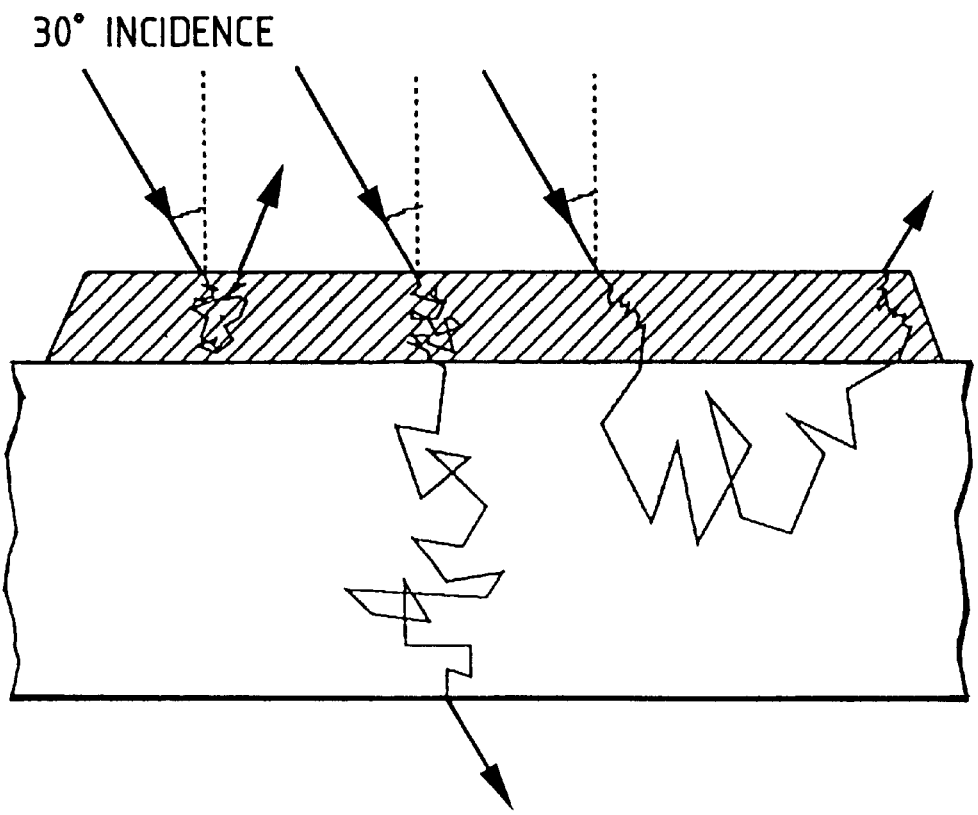
FIG. 6 is a schematic cross sectional view showing an example of a behavior of light beam in a beam tracking calculation method in a recording matter in FIG. 5.
Figure 7A:
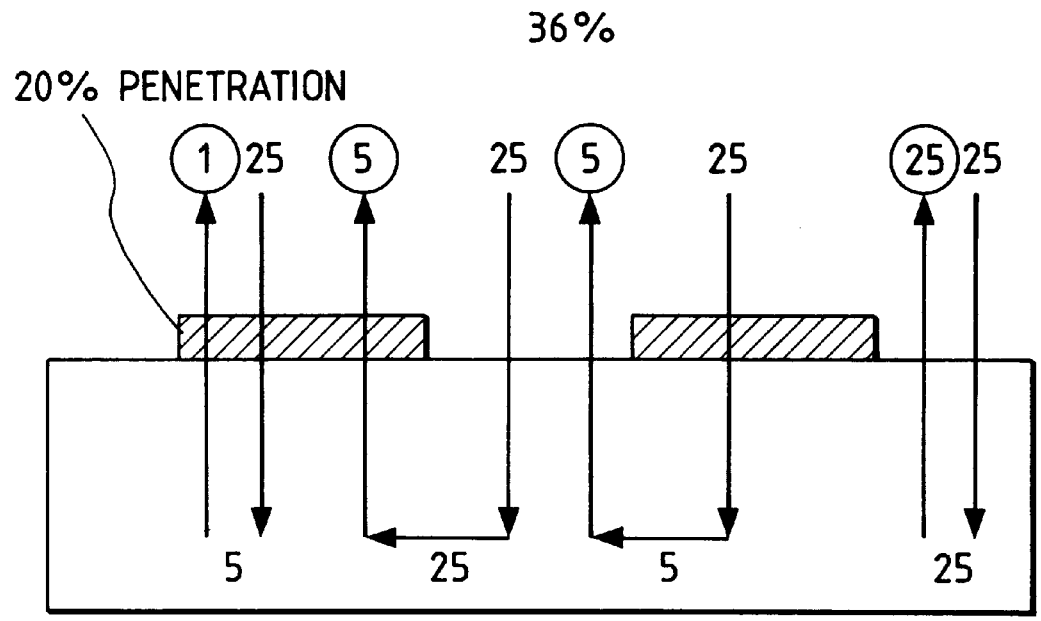
Figure 7B:
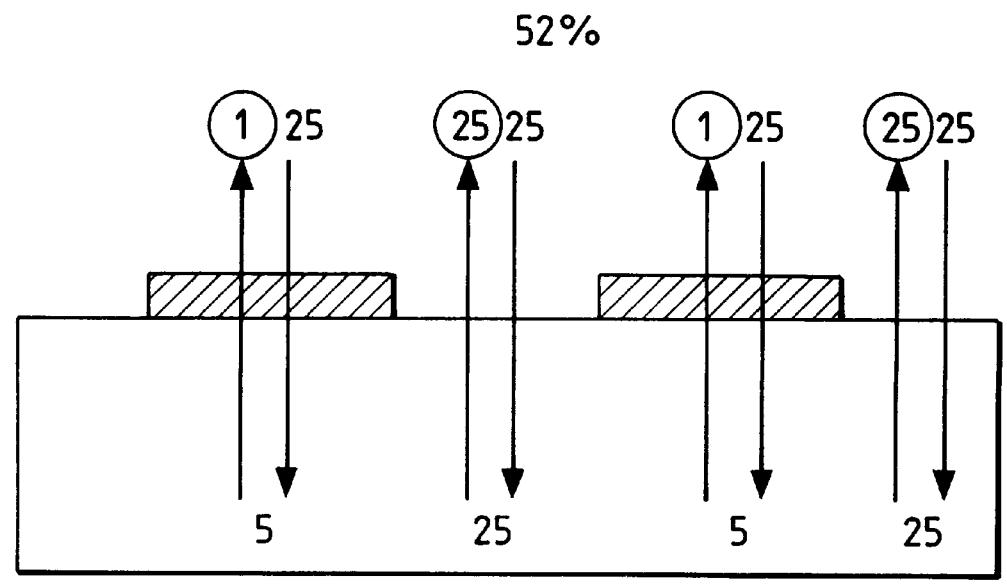
Figure 8:
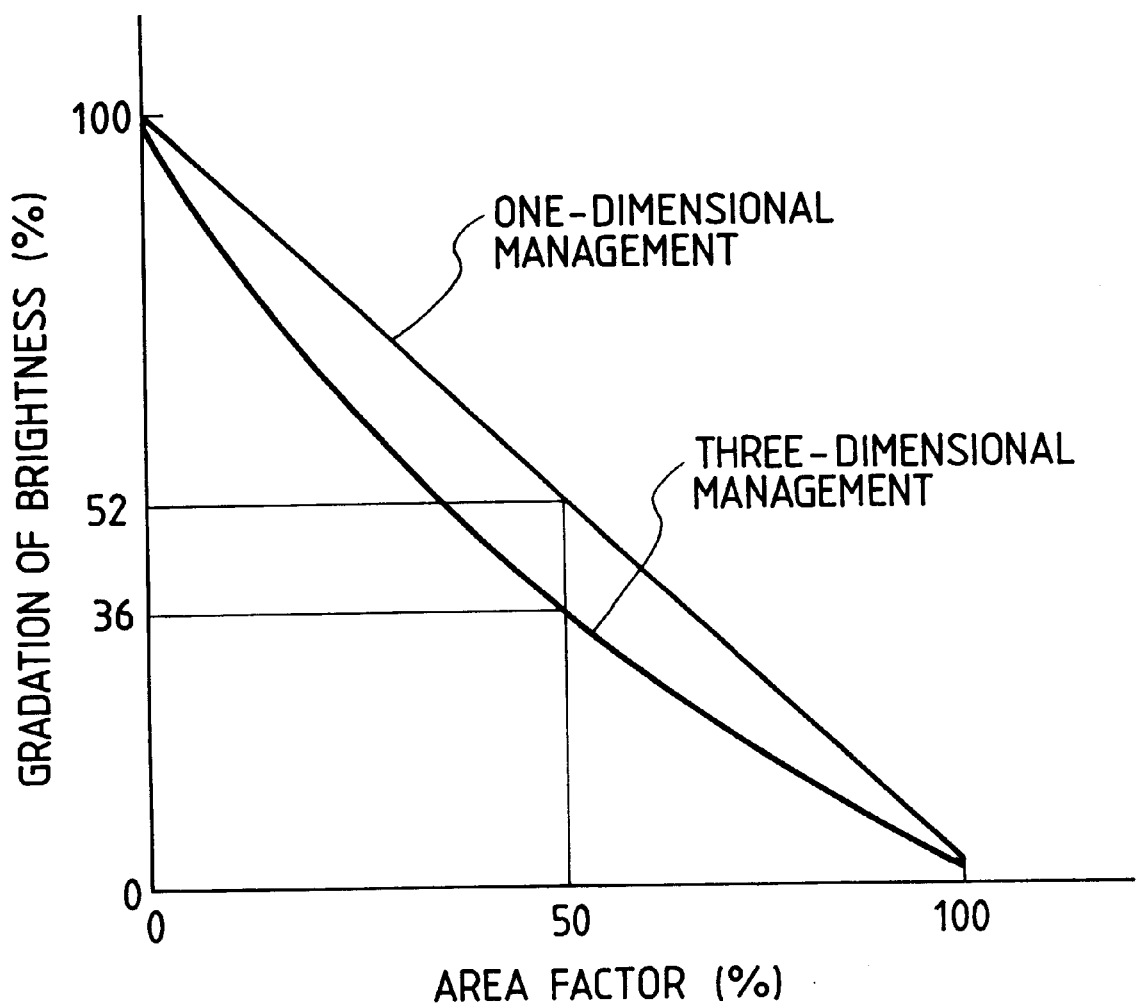
FIG. 8 is a graph showing a difference between gradations in the cases of FIGS. 7A and 7B.

FIG. 6 is a diagram showing a state of a beam tracking by using a side elevational view of the recording matter of FIG. 5. Namely, FIG. 6 shows a state in which a parallel beam enters at an incident angle of 30°.

It is now assumed that the light beam entering the recording matter based on the illumination condition characteristic values 513 causes two optical phenomena such as scattering that is determined by a scattering coefficient and absorption that is determined by an absorption coefficient. A beam propagation is decided by the scattering phenomenon. The absorption phenomenon is calculated in accordance with its propagation path. When calculating, in a toner area, the scattering coefficient and absorption coefficient of the toner based on the recording color material characteristic values 512 are used. In the case where the propagation path reaches a paper area and the light enters the paper, the scattering coefficient and absorption coefficient of the paper based on the characteristic values 511 of the material to be recorded are used.

In the case where the propagation path reaches an upper portion of the recording matter and the light is emitted out of the recording matter, such a beam is identified as a reflection light and contributes to a spectrum reflection intensity. In the case where the propagation path reaches a lower portion of the recording matter and the light is emitted out of the recording matter, such a beam is identified as a penetration light and contributes to a spectrum penetration intensity.

Figure 4:
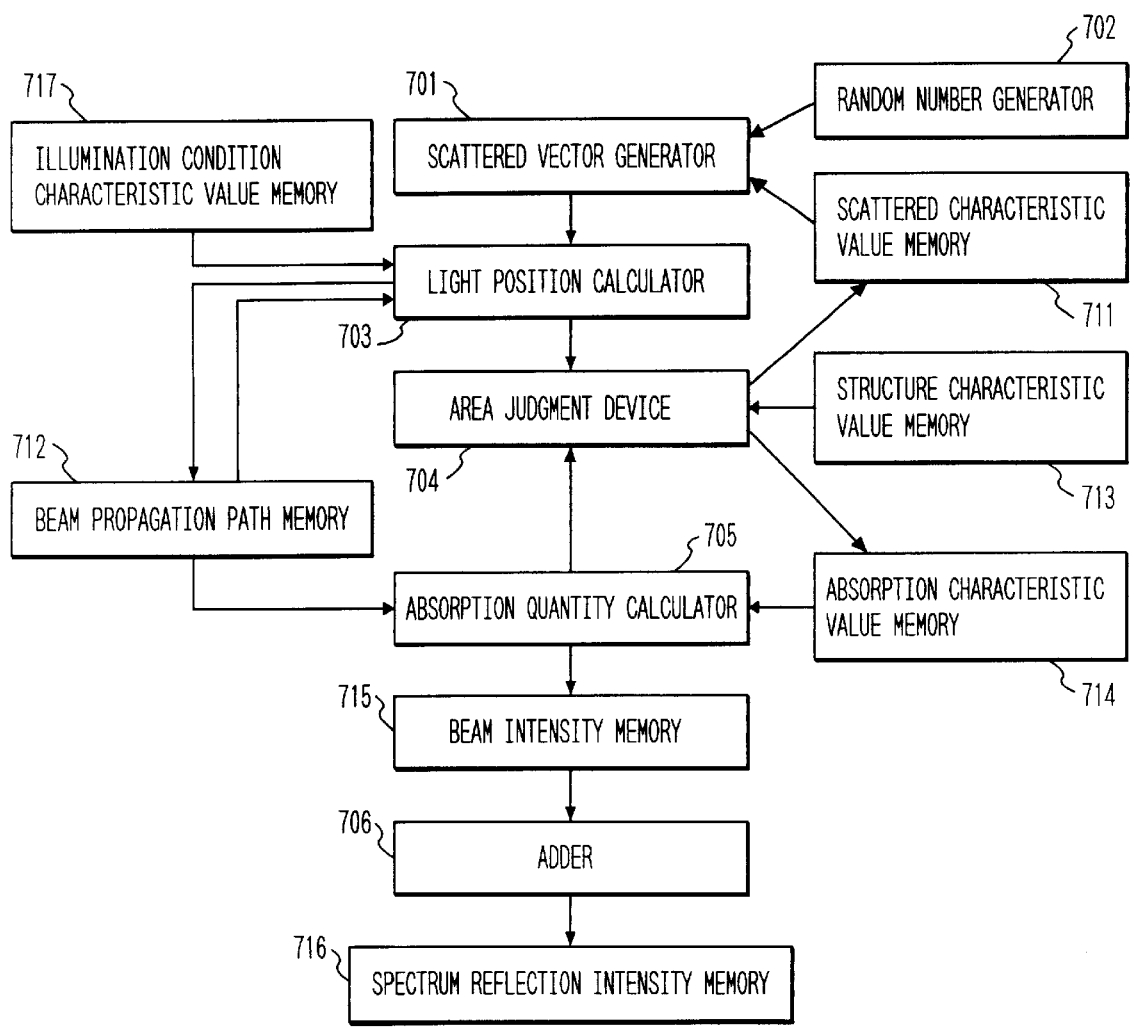
FIG. 4 is a flowchart showing an example of a flow of processing steps in recording matter optical phenomenon calculation means.

FIG. 4 is a block diagram showing a construction of the beam tracking calculating apparatus by the Monte Carlo method as an example of the optical phenomenon calculating apparatus used in the embodiment.

An illumination condition characteristic value memory 717 stores the illumination condition characteristic values 513 regarding the illumination condition at the time of measurement.

A scattered characteristic value memory 711 stores scattering characteristic values in each of the characteristic values 511 of the material to be recorded and the characteristic values 512 of the recording color material and outputs the scattering characteristic values corresponding to an area judged by an area judgment device 704 to a scattered vector generator 701.

A structure characteristic value memory 713 stores the recording condition characteristic values 514.

An absorption characteristic value memory 714 stores absorption characteristic values in each of the characteristic values 511 of the material to be recorded and the characteristic values 512 of the recording color material and outputs the absorption characteristic values corresponding to an area judged by the area judgment device 704 to an adsorption quantity calculator 705.

The scattered vector generator 701 generates a scattered vector by using random numbers generated from a random number generator 702 in a manner such that a scattering probability in the progressing direction of the beam, namely, a probability density p(r) at which a scattering occurs when the beam progresses by only a distance r is expressed by the following equation (1) and, further, the beam is uniformly scattered to a solid angle $4\pi$ while setting the angle direction of the beam to an isotropic scattering by using scattering coefficients S read out from the scattered characteristic value memory 711.

$$p(r) = S e^{-Sr} \qquad \ldots (1)$$

In the embodiment, although the scattered vector has been generated by a model of isotropic scattering, by adding an angle distribution to the characteristic values in association with the scattering coefficient, a more accurate presumption calculation can be performed. With respect to the probability density p(r), another function form can be also used in consideration of an arrangement of scattered body or the like.

A light position calculator 703 adds the scattered vector generated by the scattered vector generator 701 to the light position stored in a beam propagation path memory 712 one step before, thereby obtaining the next light position and outputting to the beam propagation path memory 712.

As an initial value of the light position, the value based on the illumination condition characteristic values stored in the illumination condition characteristic value memory 717 is used.

The beam propagation path memory 712 sequentially stores the light position outputted by the light position calculator 703.

The area judgment device 704 judges to which area of the material to be recorded, recording color material, or the like the light position calculated by the light position calculator 703 belongs on the basis of structure characteristic values read out from the structure characteristic value memory 713. The result of the judgment is outputted to the scattered characteristic value memory 711. To which area of the material to be recorded, recording color material, or the like the light position to calculate the absorption quantity belongs is also similarly judged. The result of the judgment is also outputted to the absorption characteristic value memory 714.

The above generation of the scattered vector and the calculation of the light position are repeated until the area judgment device 704 judges that the light position is out of the recording matter. By the above series of processes, the beam tracking calculation for one beam is finished and the propagation path is stored in the beam propagation path memory 712.

The absorption quantity calculator 705 calculates a light absorption quantity for one beam.

The absorption quantity is sequentially calculated in accordance with the light position read out from the beam propagation path memory.

That is, the absorption quantity is calculated on the basis of the absorption characteristic values corresponding to the area to which the light position belongs.

An example of the calculating method will now be described hereinbelow.

When the light position lies within the toner area, a beam intensity I after the beam passed for a beam intensity $I_0$ before the beam passes is calculated by the following equation (2) by using a length of propagation path, namely, a passage distance $r_t$ in the toner.

$$I = e^{-c(\lambda) r_t} I_0 \quad \ldots (2)$$

where, $c(\lambda)$ is an absorption coefficient of the toner.

On the other hand, in the case where the light position lies within a paper area, the beam intensity I after the passage for the beam intensity $I_0$ before passage is calculated by the following equation (3) by using the number of scattering points in the propagation path, namely, the number $n_p$ of scattering times in the paper.

$$I = a_p(\lambda)^{n_p} I_0 \quad \ldots (3)$$

where $a_p(\lambda)$ is the absorption coefficient of the paper.

In the embodiment, although the absorption calculation and the absorption coefficient have been handled in the toner area and paper area on the assumption that they depend on the distance and the number of scattering times, the embodiment of the invention is not limited to such an example.

The beam intensity of one beam calculated is outputted to a beam intensity memory 715.

After the beams of the number such that uniformity of the random numbers is guaranteed were added, the beam intensity stored in the beam intensity memory 715 is read out and added by an adder 706, so that the spectrum reflection intensity is obtained and outputted to a spectrum reflection intensity memory 716.

Target optical characteristic value input means 503 in FIG. 1 inputs optical characteristic values of an image recording matter that is actually desired (S2).

In the embodiment, the spectrum reflection intensity as one expression of color information is used as an optical characteristic value.

Optical characteristic value comparison judgment means 504 compares the target optical characteristic value inputted by the target optical characteristic value input means 503 with the optical characteristic value calculated by the recording matter optical phenomenon calculation means 502. When a difference between them is equal to or less than a necessary precision, the judgment means 504 decides that the judgment result is "yes", and when it is larger than the necessary precision, it is determined that the judgment result is "no"(S4).

When an output of the optical characteristic value comparison judgment means 504 indicates "no", the processing routine advances to change quantity determination means 505.

From the information such as difference between the target optical characteristic value and the optical characteristic value derived by the recording matter optical phenomenon calculation and its recording condition dependency and the like, the change quantity determination means 505 presumes which recording condition should be set to reduce such a difference as a subsequent processing step and determines a change quantity from the present recording condition to the recording condition in the next processing step (S5). As a presuming method, what is called an optimization method such as method of least squares, Lagrange multiplier method, simulated annealing method, or the like can be used.

When the output of the judgment means 504 indicates "yes", the processing routine advances to actual recording condition determination means 506.

When the judgment result is "yes", the actual recording condition determination means 506 converts the recording condition characteristic values 514 used in the recording matter optical phenomenon calculation means 502 to the actual recording condition suitable for actual recording condition adjustment means 507 and image recording means 508 (S6).

As an actual recording condition to change a thickness of toner, for example, a charge quantity of a photosensitive drum or the like can be mentioned.

Actual recording condition adjustment means 507 adjusts the actual recording condition outputted from the actual recording condition determination means 506 (S7).

The image recording means 508 actually records an image in a state in which the actual recording condition is adjusted by the actual recording condition adjustment means 507 (S8).

A CPU 520 controls each of the above means by using a RAM 522 on the basis of a program stored in a ROM 521.

According to the embodiment, an image reproducibility is presumed at a high precision and the optimum image formation characteristic values can be set.

The recording adjustment can be also automatically executed without performing a test print.

Embodiment 2

Figure 3:
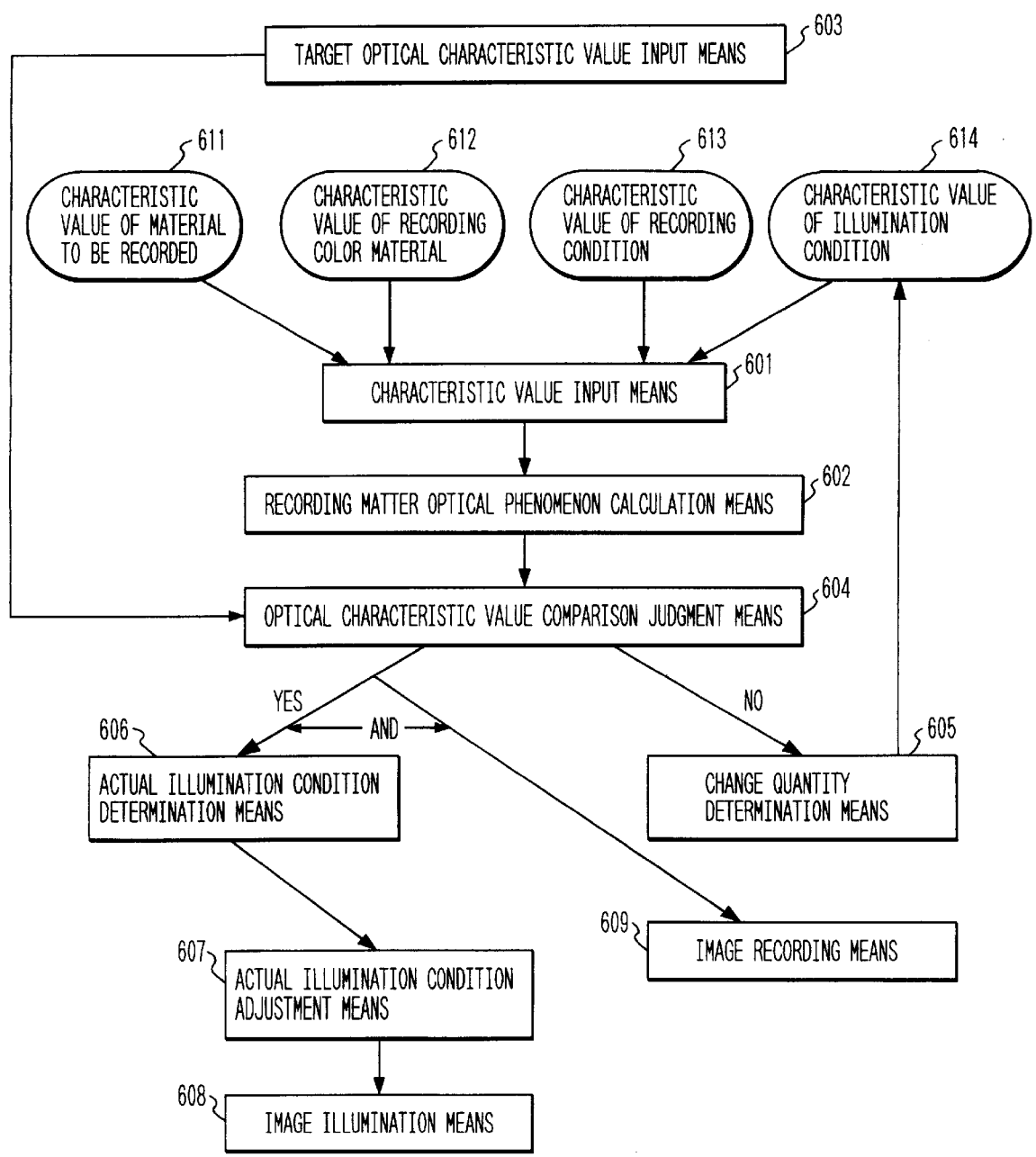
FIG. 3 is a block diagram showing an example of a construction of an image processing apparatus according to an embodiment 2.

In addition to the method of obtaining the target image record by feedback controlling the recording condition as shown in embodiment 1, it is also possible to use a method of obtaining a target image reproduction by controlling an illumination condition as shown in FIG. 3. With this method, an image reproduction in which the effective image adjustment was performed can be also executed in a manner similar to embodiment 1.

In such a case, the system functions as an image reproducing system as what is called a color management system also including the illumination without merely limiting to the control of the image recording matter.

Embodiment 3

As another method utilizing the methods shown in embodiments 1 and 2, a method of obtaining a target image reproduction by simultaneously feedback controlling both the recording condition and the illumination condition is also effective in a manner similar to embodiments 1 and 2.

In the case where the image recording method of the target is based on binary data, the values per unit area are used as absorption coefficient and scattering coefficient in each of the above embodiments. In the case where the image recording method of the target is based on multi-value data, the values obtained by converting the values per unit area on the basis of the toner density are used.

Each of the characteristic value can be also previously converted to profile data and handled without detecting at that time.

As described above, according to the foregoing embodiments, the presuming method and apparatus for presuming the image reproducibility of the recording matter, after the recording with enough precision, from the characteristics of the material to be recorded and the recording color material, are obtained. The image adjusting device, which can automatically adjust the recording at a high precision without performing a test print, by feedback control of to the recording condition by using the above presuming method and apparatus, can be obtained. An excellent image recording apparatus using such an image adjusting device can be derived.

The present invention is not limited to the foregoing embodiments but many modifications and variations are possible within the spirit and scope of the appended claims of the invention.

What is claimed is:

1. An image processing apparatus comprising:
   characteristic value input means for inputting image formation characteristic values in an image formation;
   presuming means for three-dimensionally presuming image reproduction information of an image formed on the basis of said image formation characteristic values;
   target reproduction information input means for inputting reproduction information of a target image; and
   setting means for setting said image formation characteristic values on the basis of said presumed image reproduction information and said target reproduction information.

2. An apparatus according to claim 1, wherein said presuming means presumes an optical characteristic value.

3. An apparatus according to claim 1, wherein said presuming means executes a beam tracking calculation.

4. An image processing apparatus for deciding an image recording condition in an image reproduction using a recording matter constructed by a material to be recorded and a recording color material, comprising:
   (1) characteristic value input means for inputting characteristic values of said material to be recorded, characteristic values of said recording color material, and at least one of a recording condition characteristic value and an illumination condition characteristic value of said recording matter;
   (2) recording matter optical phenomenon calculation means for virtually calculating an optical phenomenon in the recording matter on the basis of said characteristic values and outputting an optical characteristic value of the recording matter;
   (3) target optical characteristic value input means for inputting an optical characteristic value of a target recording matter;
   (4) optical characteristic value comparison judgment means for comparing said target optical characteristic value and the optical characteristic value of the recording matter outputted by said recording matter optical phenomenon calculation means, thereby judging whether a deviation from a target value is equal to or less than a permission value or not;
   (5) change quantity determination means for determining a change quantity of said recording condition characteristic value on the basis of a result of the comparison in the case where said deviation is larger than said permission value as a result of said judgment; and
   (6) recording condition output means for outputting the recording condition used in the case where said deviation is equal to or less than said permission value as a result of said judgement.

5. An apparatus according to claim 4, wherein said recording matter optical phenomenon calculation means uses a beam tracking calculation by a Monte Carlo method.

6. An apparatus according to claim 4, wherein said characteristic values of said material to be recorded are one or more characteristic values selected from a group of shape information of the material to be recorded, a scattering coefficient, an absorption coefficient, and a scattering angle distribution.

7. An apparatus according to claim 6, wherein the characteristic values of said material to be recorded are characteristic values which are determined by optical phenomenon calculation means of the material to be recorded from at least one of a spectrum reflectance and a spectrum transmittance of the material to be recorded.

8. An apparatus according to claim 4, wherein the characteristic values of said recording color material are one or more characteristic values selected from a group of a density, a spectrum transmittance, a scattering coefficient, an absorption coefficient, and a scattering angle distribution.

9. An apparatus according to claim 4, wherein said recording condition characteristic value is one or more characteristic values selected from a group of a recording color material kind, a recording color material density, a recording color material quantity, and a shape of the recording color material in the recording matter.

10. An apparatus according to claim 1, further comprising:
    actual recording condition determination means for determining an actual recording condition on the basis of the recording condition outputted from recording condition output means; and image recording means for recording in accordance with the actual recording condition determined by said actual recording condition determination means.

11. An image processing apparatus for deciding an image illumination condition in an image reproduction using a recording matter constructed by a material to be recorded and a recording color material, comprising:

(1) characteristic value input means for inputting characteristic values of said material to be recorded, characteristic values of said recording color material, and at least one of a recording condition characteristic value and an illumination condition characteristic value of said recording matter;

(2) recording matter optical phenomenon calculation means for virtually calculating an optical phenomenon in the recording matter on the basis of said characteristic values and outputting an optical characteristic value of the recording matter;

(3) target optical characteristic value input means for inputting an optical characteristic value of a target recording matter;

(4) optical characteristic value comparison judgment means for comparing said target optical characteristic value and the optical characteristic value of the recording matter outputted by said recording matter optical phenomenon calculation means, thereby judging whether a deviation from a target value is equal to or less than a permission value or not;

(5) change quantity determination means for determining a change quantity of said illumination condition characteristic value on the basis of a result of the comparison in the case where said deviation is larger than said permission value as a result of said judgment; and (6) illumination condition output means for outputting the illumination condition used in the case where said deviation is equal to or less than said permission value as a result of said judgement.

12. An apparatus according to claim 11, wherein said recording matter optical phenomenon calculation means uses a beam tracking calculation by a Monte Carlo method.

13. An apparatus according to claim 11, wherein said characteristic values of said material to be recorded are one or more characteristic values selected from a group of shape information of the material to be recorded, a scattering coefficient, an absorption coefficient, and a scattering angle distribution.

14. An apparatus according to claim 13, wherein the characteristic values of said material to be recorded are characteristic values which are determined by optical phenomenon calculation means of the material to be recorded from at least one of a spectrum reflectance and a spectrum transmittance of the material to be recorded.

15. An apparatus according to claim 11, wherein the characteristic values of said recording color material are one or more characteristic values selected from a group of a density, a spectrum transmittance, a scattering coefficient, an absorption coefficient, and a scattering angle distribution.

16. An image processing method comprising:
a characteristic value input step of inputting image formation characteristic values in an image formation;
a presuming step of three-dimensionally presuming image reproduction information of an image formed on the basis of said image formation characteristic values;
a target reproduction information input step of inputting reproduction information of a target image; and
a setting step of setting said image formation characteristic values on the basis of said presumed image reproduction information and said target reproduction information.

17. An image processing method of deciding an image recording condition in an image reproduction using a recording matter constructed by a material to be recorded and a recording color material, comprising:

(1) a characteristic value input step of inputting characteristic values of said material to be recorded, characteristic values of said recording color material, and at least one of a recording condition characteristic value and an illumination condition characteristic value of said recording matter;

(2) a recording matter optical phenomenon calculation step of virtually calculating an optical phenomenon in the recording matter on the basis of said characteristic values and outputting an optical characteristic value of the recording matter;

(3) a target optical characteristic value input step of inputting an optical characteristic value of a target recording matter;

(4) an optical characteristic value comparison judgment step of comparing said target optical characteristic value and the optical characteristic value of the recording matter outputted in said recording matter optical phenomenon calculation step, thereby judging whether a deviation from a target value is equal to or less than a permission value or not;

(5) a change quantity determination step of determining a change quantity of said recording condition characteristic value on the basis of a result of the comparison in the case where said deviation is larger than said permission value as a result of said judgment; and (6) a recording condition output step of outputting the recording condition used in the case where said deviation is equal to or less than said permission value as a result of said judgement.

18. An image processing method of deciding an image illumination condition in an image reproduction using a recording matter constructed by a material to be recorded and a recording color material, comprising:

(1) a characteristic value input step of inputting characteristic values of said material to be recorded, characteristic values of said recording color material, and at least one of a recording condition characteristic value and an illumination condition characteristic value of said recording matter;

(2) a recording matter optical phenomenon calculation step of virtually calculating an optical phenomenon in the recording matter on the basis of said characteristic values and outputting an optical characteristic value of the recording matter;

(3) a target optical characteristic value input step of inputting an optical characteristic value of a target recording matter;

(4) an optical characteristic value comparison judgment step of comparing said target optical characteristic value and the optical characteristic value of the recording matter outputted in said recording matter optical phenomenon calculation step, thereby judging whether a deviation from a target value is equal to or less than a permission value or not;

(5) a change quantity determination step of determining a change quantity of said illumination condition characteristic value on the basis of a result of the comparison in the case where said deviation is larger than said permission value as a result of said judgment; and (6) an illumination condition output step of outputting the illumination condition used in the case where said deviation is equal to or less than said permission value as a result of said judgement.

19. An image processing method comprising:

a characteristic value input step of inputting image formation characteristic values in an image formation;

a presuming step of three-dimensionally presuming image reproduction information of an image formed on the basis of the image formation characteristic values; and an outputting step of outputting the image reproduction information.

20. A method according to claim 19, wherein said presuming step presumes an optical characteristic value.

21. A method according to claim 19, wherein said presuming step executes a beam tracking calculation.

22. An image processing apparatus comprising:

characteristic value input means for inputting image formation characteristic values in an image formation;

presuming means for three-dimensionally presuming image reproduction information of an image formed on the basis of the image formation characteristic values; and outputting means for outputting the image reproduction information.

* * * * *

UNITED STATES PATENT AND TRADEMARK OFFICE
CERTIFICATE OF CORRECTION

PATENT NO. : 5,915,076

DATED : June 22, 1999

INVENTOR(S): MITSURO SUGITA

It is certified that error appears in the above-identified patent and that said Letters Patent is hereby corrected as shown below:

On the Title Page,
AT [56] REFERENCES CITED:

After the list of cited U.S. Patent Documents, please insert
--FOREIGN PATENT DOCUMENTS
            5-025872 4/1993 Japan
            5-080625 4/1993 Japan
            5-176166 7/1993 Japan
            5-221051 8/1993 Japan
            6-026906 4/1994 Japan--.

COLUMN 1:

Line 5, "1995 ," should read --1995,--; and
Line 28, "desired" should read --desired,--.

UNITED STATES PATENT AND TRADEMARK OFFICE
CERTIFICATE OF CORRECTION

PATENT NO. : 5,915,076

DATED : June 22, 1999

INVENTOR(S): MITSURO SUGITA

It is certified that error appears in the above-identified patent and that said Letters Patent is hereby corrected as shown below:

COLUMN 2:

Line 48, "an" should be deleted;
Line 50, "the" should be deleted;
Line 53, "an" should be deleted; and
Line 60, "cross sectional" should read --cross-sectional--.

COLUMN 3:

Line 7, "an" (1st occurrence) should be deleted.

UNITED STATES PATENT AND TRADEMARK OFFICE
CERTIFICATE OF CORRECTION

PATENT NO. : 5,915,076

DATED : June 22, 1999

INVENTOR(S): MITSURO SUGITA

It is certified that error appears in the above-identified patent and that said Letters Patent is hereby corrected as shown below:

COLUMN 7:

Line 31, "value" should read --values--.

Signed and Sealed this

Twenty-seventh Day of March, 2001

*Attest:*

NICHOLAS P. GODICI

*Attesting Officer*   Acting Director of the United States Patent and Trademark Office